United States Patent
Suda (10) Patent No.: US 11,425,548 B2
(45) Date of Patent: Aug. 23, 2022

(54) METHOD TO IDENTIFY TRACTOR AND TRAILERS AND THE ORDER OF HOOK UP

(71) Applicant: Hegemon Electronics, Inc., Sterling Heights, MI (US)

(72) Inventor: Raymond A. Suda, Sterling Heights, MI (US)

(73) Assignee: Hegemon Electronics, Inc., Sterling Heights, MI (US)

( * ) Notice: Subject to any disclaimer, the term of this patent is extended or adjusted under 35 U.S.C. 154(b) by 0 days.

(21) Appl. No.: 17/362,193

(22) Filed: Jun. 29, 2021

(65) Prior Publication Data

US 2021/0409925 A1    Dec. 30, 2021

Related U.S. Application Data

(60) Provisional application No. 63/045,555, filed on Jun. 29, 2020.

(51) Int. Cl.
*H04B 7/00* (2006.01)
*H04W 4/80* (2018.01)
*H04B 17/318* (2015.01)
*B62D 53/00* (2006.01)

(52) U.S. Cl.
CPC ............ *H04W 4/80* (2018.02); *H04B 17/318* (2015.01); *B62D 53/005* (2013.01)

(58) Field of Classification Search
CPC ...... H04W 4/80; H04B 17/318; B62D 53/005
USPC ...................................................... 455/41.2
See application file for complete search history.

(56) References Cited

U.S. PATENT DOCUMENTS

| | | | | |
|---|---|---|---|---|
| 4,897,642 A * | 1/1990 | DiLullo | ............... | G01S 5/0009 701/1 |
| 5,905,433 A * | 5/1999 | Wortham | ............... | G07C 5/008 340/3.4 |
| 6,970,772 B2 * | 11/2005 | Radtke | ................... | H04B 3/548 701/32.7 |
| 7,449,993 B2 * | 11/2008 | Lesesky | ................. | G07C 5/008 340/933 |
| 10,841,127 B1 * | 11/2020 | Greer | ...................... | H04L 12/46 |
| 2004/0207514 A1 * | 10/2004 | Lesesky | ................ | G08G 1/017 340/431 |

(Continued)

FOREIGN PATENT DOCUMENTS

KR   10-2005-0001490 A    1/2005
KR   10-2006-0110073 A    10/2006

(Continued)

*Primary Examiner* — April G Gonzales
(74) *Attorney, Agent, or Firm* — Young Basile Hanlon & MacFarlane, P.C.

(57) ABSTRACT

Connected tractor and trailer identifications and the order of hook-up of multiple trailers to a tractor is are determined by identifying trailer VINs using a PLC system and eliminating Bluetooth signals that do not broadcast trailer VINs that match the PLC system. A tractor-based Bluetooth trailer order and a trailer-based Bluetooth trailer order utilizing RSSI value strengths are determined. The trailer order is set if the tractor-based Bluetooth trailer order matches the trailer-based Bluetooth order. If the order does not match, a RSSI value weighting process is used to choose between the tractor-based order and the trailer-based order.

3 Claims, 13 Drawing Sheets

(56) References Cited

U.S. PATENT DOCUMENTS

| | | | |
|---|---|---|---|
| 2006/0261935 A1* | 11/2006 | McAden | B60R 25/00 340/431 |
| 2007/0038353 A1* | 2/2007 | Larschan | G07C 5/085 701/33.4 |
| 2007/0206658 A1* | 9/2007 | Park | H04W 92/02 375/130 |
| 2007/0225872 A1* | 9/2007 | Luebke | G08G 1/017 701/1 |
| 2007/0241868 A1* | 10/2007 | Fackrell | B60T 7/042 340/533 |
| 2008/0061963 A1* | 3/2008 | Schnitz | G06Q 20/203 340/539.13 |
| 2008/0111693 A1 | 5/2008 | Johnson et al. | |
| 2008/0125965 A1* | 5/2008 | Carani | G08G 1/13 340/539.13 |
| 2008/0184751 A1* | 8/2008 | Olsen | G07C 9/28 70/256 |
| 2008/0227411 A1* | 9/2008 | Martinez | B60D 1/62 455/90.1 |
| 2008/0303648 A1* | 12/2008 | Day | B60D 1/62 340/431 |
| 2009/0045924 A1* | 2/2009 | Roberts, Sr. | G08G 1/20 340/10.41 |
| 2009/0102626 A1* | 4/2009 | Lesesky | G08G 1/017 340/431 |
| 2009/0177349 A1* | 7/2009 | Lesesky | B60T 13/662 303/123 |
| 2009/0299567 A1* | 12/2009 | Larschan | G07C 5/085 701/29.2 |
| 2010/0019881 A1* | 1/2010 | Shimura | B60C 23/0483 340/10.1 |
| 2011/0037579 A1* | 2/2011 | Lesesky | B60R 16/0315 340/431 |
| 2011/0090091 A1* | 4/2011 | Lerche | E21B 43/119 340/853.2 |
| 2011/0218702 A1* | 9/2011 | Larschan | G07C 5/04 701/31.4 |
| 2011/0257835 A1* | 10/2011 | Larschan | G07C 5/008 701/31.4 |
| 2011/0279253 A1* | 11/2011 | Suda | G06Q 10/0833 340/431 |
| 2011/0281522 A1* | 11/2011 | Suda | G06Q 10/0833 455/41.2 |
| 2012/0203398 A1* | 8/2012 | Roberts, Sr. | G08G 1/20 701/1 |
| 2013/0148748 A1* | 6/2013 | Suda | H04B 3/546 375/257 |
| 2022/0073156 A1* | 3/2022 | Lauer | B62D 53/005 |

FOREIGN PATENT DOCUMENTS

| | | |
|---|---|---|
| KR | 100684613 B1 | 2/2007 |
| KR | 100793585 B1 | 1/2008 |
| WO | 2008/114029 A1 | 9/2008 |
| WO | 2011/142852 A1 | 11/2011 |
| WO | 2013/086517 A1 | 6/2013 |

* cited by examiner

Fig. 10: Trailer Order Algorithm

Module A is tractor
Module B is trailer #1
Module C is trailer #2
Module D is trailer #3
Module Φ is trailer #N METHOD 1: Determine order of trailers using the tractor as a reference.
Step 1: MASTER gets RSSI value of CLIENT

| Tractor (A) | Trailer #1 (B) | Trailer #2 (C) | Trailer #3 (D) | ~ | Trailer #N (Φ) |
|---|---|---|---|---|---|
| A gets RSSI value of B | B gets RSSI value of A | C gets RSSI value of A | D gets RSSI value of A | ~ | Φ gets RSSI value of A |
| A gets RSSI value of C | B gets RSSI value of C | C gets RSSI value of B | D gets RSSI value of B | ~ | Φ gets RSSI value of B |
| A gets RSSI value of D | B gets RSSI value of D | C gets RSSI value of D | D gets RSSI value of C | ~ | Φ gets RSSI value of C |
| ~ | ~ | ~ | ~ | ~ | ~ |
| A gets RSSI value of Φ | B gets RSSI value of Φ | C gets RSSI value of Φ | D gets RSSI value of Φ | ~ | Φ gets RSSI value of (Φ-1) |

Step 2:
    a. Look at RSSI values from each trailer to the tractor (column A). Determine Tractor Based BT Trailer Order Reliability Factor ($T_{BBOR}$). Lowest negative number is the closest to tractor.
    b. Look at RSSI values from tractor to each trailer (row 1 skipping column A). Determine Trailer Based BT Trailer Order Reliability Factor ($TR_{BBOR}$). Lowest negative number is the closest to tractor.
    c. If order determined in a and b match, then done. Trailer order is known.
    d. If trailer order from a and b do not match, then go to METHOD 2, Step 3.

METHOD 2: Determine order of trailers by comparing trailer RSSI values.
Step 3:
    From the trailer order determined in Step 2a, determine who is next to whom by using steps 3a - 3d.
    Exclude Tractor RSSI values:
    a. Is T#1 next to T#2? <T#1 is MASTER>    If true, assign a value of 1.
    b. Is T#2 next to T#3? <T#2 is MASTER>    If true, assign a value of 1.
    c. Is T#2 next to T#1? <T#2 is MASTER>    If true, assign a value of 1.
    d. Is T#3 next to T#2? <T#3 is MASTER>    If true, assign a value of 1.

Step 4:
    From the trailer order determined in Step 2b, , determine who is next to whom by using steps 4a - 4d.
    Exclude Tractor RSSI values:
    a. Is T#1 next to T#2? <T#1 is MASTER>    If true, assign a value of 1.
    b. Is T#2 next to T#3? <T#2 is MASTER>    If true, assign a value of 1.
    c. Is T#2 next to T#1? <T#2 is MASTER>    If true, assign a value of 1.
    d. Is T#3 next to T#2? <T#3 is MASTER>    If true, assign a value of 1.

Step 5:
    a. Add up all 1's in Step 3 and Step 4. The highest number wins the trailer order.
    b. If the sums are equal and the order in steps 2A and 2B are equal then the trailer order is known... the order in steps 2A and 2B. This is the case when the last trailer is out of range of the tractor.
    c. If there is a tie or no true's, then go to Step 6.

Step 6:
    Reduce TX power by one on all Bluetooth devices and repeat steps 1-5.

| FROM | TO | CASE 1 | CASE 2 |
|---|---|---|---|
| A | B | -79.4 | -83.7 |
| A | C | -82.4 | -80.5 |
| A | D | -87.3 | -82.9 |
| B | A | -80.8 | -78.2 |
| B | C | -79.9 | -74.8 |
| B | D | --87.7 | -83.3 |
| C | A | -81.2 | -79.9 |
| C | B | -79.8 | -77.6 |
| C | D | -86.5 | -73.9 |
| D | A | -89.1 | -89.6 |
| D | B | -89.3 | -89.7 |
| D | C | -84.6 | -85.4 |

Table 1: RSSI values in dBm

Fig 11

METHOD TO IDENTIFY TRACTOR AND TRAILERS AND THE ORDER OF HOOK UP

CROSS-REFERENCE TO RELATED APPLICATION(S)

This application claims priority to U.S. Provisional Patent Application No. 63/045,555, filed on Jun. 29, 2020, the content of which is incorporated herein in its entirely by reference.

TECHNICAL FIELD

The present description relates, in general, to tractor-trailer communication system. The present invention also relates, in general, to any trailering system including railway cars or autonomous vehicle trailering.

BACKGROUND

The freight industry employs tractors that move one or more tandem or serially-connected trailers between various locations. A standard seven conductor umbilical cord may be coupled between the tractor and the first trailer, and between each pair of trailers to provide electrical power from controls in the tractor to the trailer brake lights, turn signals etc.

Today's freight companies transport goods over wide geographic locations. This widespread geographic area coupled with the trend for adjusting time deliveries as well as overnight deliveries, has necessitated a need for a freight company to know where each tractor and trailer is at any given time so as to coordinate delivery schedules, change routing etc. Currently, a GPS system on the tractor and/or trailers can enable a central office of a freight company to immediately identify the geographic location of a specific tractor or trailer.

SUMMARY

As referred to initially, a standard seven conductor umbilical cord may be used for communications between tractors and the one or more tandem or serially-connected trailers they move and used for electrical power to the trailers for the trailer brake lights, turn signals, etc. However, the increased use of electronic modules on the trailer requires additional data communication conductors to avoid the expense of a separate umbilical cord to control such electronic modules, such as an ABS controller, an air tire pressure controller, or a temperature controller on the trailers. Power line carrier systems have been devised that provide data signals over one of the umbilical cord conductors to communicate information bi-directionally between the tractor and each trailer via power line carrier readers or gateways.

The electronic identification of a particular tractor or trailer has required the use of specific power line carrier modules that can be programmed with a particular tractor or trailer identification number on which they are mounted. This is added cost to the power line carrier system.

PLC identifier tags, such as a PLC identifier tag manufactured by Hegemon Electronics, Inc., Sterling Heights, Mich., have been available since at least as early as 2005. Such a PLC identifier tag, when installed on a tractor or trailer, sends out a unique programmable identification number at regular intervals onto the vehicle PLC power line. This periodic vehicle identification transmission may be detected by a PLC Gateway mounted in the tractor or trailer and be used to detect the connection and disconnection of a trailer to and from a tractor. The detection of a connection or disconnection event may be transmitted by the PLC Gateway to a remotely located processor.

While such this system and the GPS system allow a freight company to determine the identification entity location of any trailer or tractor in its system at any given time, they do not determine the specific order that multiple trailers are connected in tandem to a particular tractor. This is important for scheduling and deliveries in a time efficient manner.

It would be desirable to provide improvements in tractor-trailer communication and identification systems using a power line carrier system in combination with wireless communications modules to establish and verify trailer order.

At power up (ignition on) all PLC devices may transmit a PLC message that identifies them as either a tractor device or a trailer device along with their VIN numbers. Each PLC device can store this information (e.g., in RAM). At this time, the tractor knows how many and the identification of each trailer in the system, but the order is not known. This may be done using Hegemon's PLC Trailer Decoder device.

The tractor device can then send out a Bluetooth (BT) scan and read all the Bluetooth modules that are within its scan range. At this point, it should be noted that each PLC device on the system powers up with its BT module set to its max TX power level. The scan messages received back can be from either a trailer device or any other BT device within range. A scan message received from a trailer device will contain the trailer's BT address, its VIN number and its RSSI value. The tractor device now sorts through all the received messages and discards all the BT messages that are not from a trailer device. Next, by comparing the VIN number received back and the VIN number received over the PLC bus, the tractor device can quickly eliminate all trailers/BT messages not connected to it.

At this point the tractor device knows all the trailer devices that are attached to the tractor, their identification number (VIN or other), any other information being transmitted over the PLC bus such as weight, refer temperature, etc., and their BT addresses. This information may be used to determine the trailer order.

According to an aspect of the teachings herein, a method of determining a sequential order of a series of trailers attached to a tractor includes setting a Bluetooth module system power level to its highest setting, and performing, using a PLC system and the Bluetooth module system, a trailer identification routine, the routine including identifying, by the PLC system, trailer VIN #s of attached trailers, scanning, by the Bluetooth module system, for Bluetooth signals containing Bluetooth Addresses, trailer VIN #s, and RSSI values, comparing, by the Bluetooth module system, the trailer VIN #s from the Bluetooth signals to the trailer VIN #s from the PLC system, eliminating, by the Bluetooth module system, Bluetooth addresses that do not contain matching trailer VIN #s, and registering, by the Bluetooth module system, Bluetooth addresses that contain matching trailer VIN #s. The method also includes determining, by the Bluetooth module system, a tractor-based Bluetooth trailer order, determining, by the Bluetooth module system, a trailer-based Bluetooth trailer order, comparing, by the Bluetooth module system, the tractor-based Bluetooth trailer order to the trailer-based Bluetooth trailer order, setting, by the Bluetooth module system, a registered trailer order if the tractor-based Bluetooth trailer order matches the trailer-based Bluetooth trailer order, utilizing, by the Bluetooth module system, a RSSI weighted trailer order process if the tractor-based Bluetooth trailer order does not match the trailer-based Bluetooth trailer order, and setting, by the Bluetooth module system, a registered trailer order as either the tractor-based Bluetooth trailer order or the trailer-based Bluetooth trailer order based on the RSSI weighted trailer order.

In some implementations of the method, determining the tractor-based Bluetooth trailer order includes receiving, by a tractor Bluetooth module, registered Bluetooth addresses and their RSSI values from a plurality of trailer Bluetooth modules, sorting, by the Bluetooth module system, the registered Bluetooth addresses by RSSI value strength to determine the tractor-based Bluetooth trailer order, and storing, by the Bluetooth module system, the tractor-based Bluetooth trailer order.

In some implementations of the method, determining the trailer-based Bluetooth trailer order includes receiving, by a plurality of trailer Bluetooth modules, a registered Bluetooth address and its RSSI value from a tractor Bluetooth module, sorting, by the Bluetooth module system, the registered Bluetooth address by RSSI value strength to determine the trailer-based Bluetooth trailer order, and storing, by the Bluetooth module system, the trailer-based Bluetooth trailer order.

BRIEF DESCRIPTION OF THE DRAWINGS

The various features, advantages and other uses of the present apparatus and method will become more apparent by referring to the following detailed description and drawing where like numerals represent like elements unless otherwise noted or clear from context.

FIG. 10 is an alternate depiction of an algorithm described in FIGS. 3-9.

DETAILED DESCRIPTION

The techniques described herein identify a plurality of trailers, each having unique trailer identification, and the order of hook up of the trailers sequentially coupled to a tractor.

Figure 1:
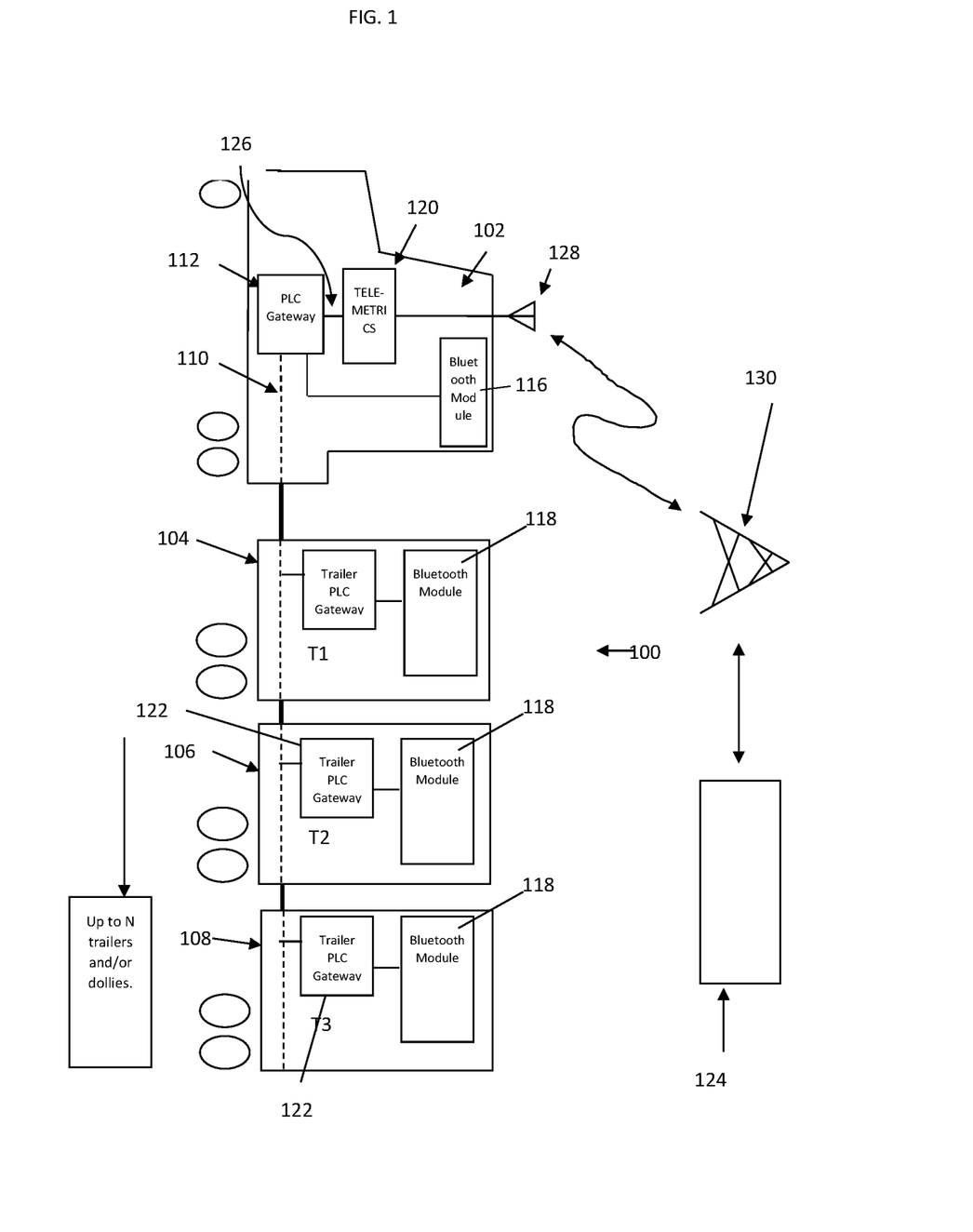
FIG. 1 is a block diagram of one aspect of the tractor-trailer identification and order of hook-up apparatus.
Figure 2:
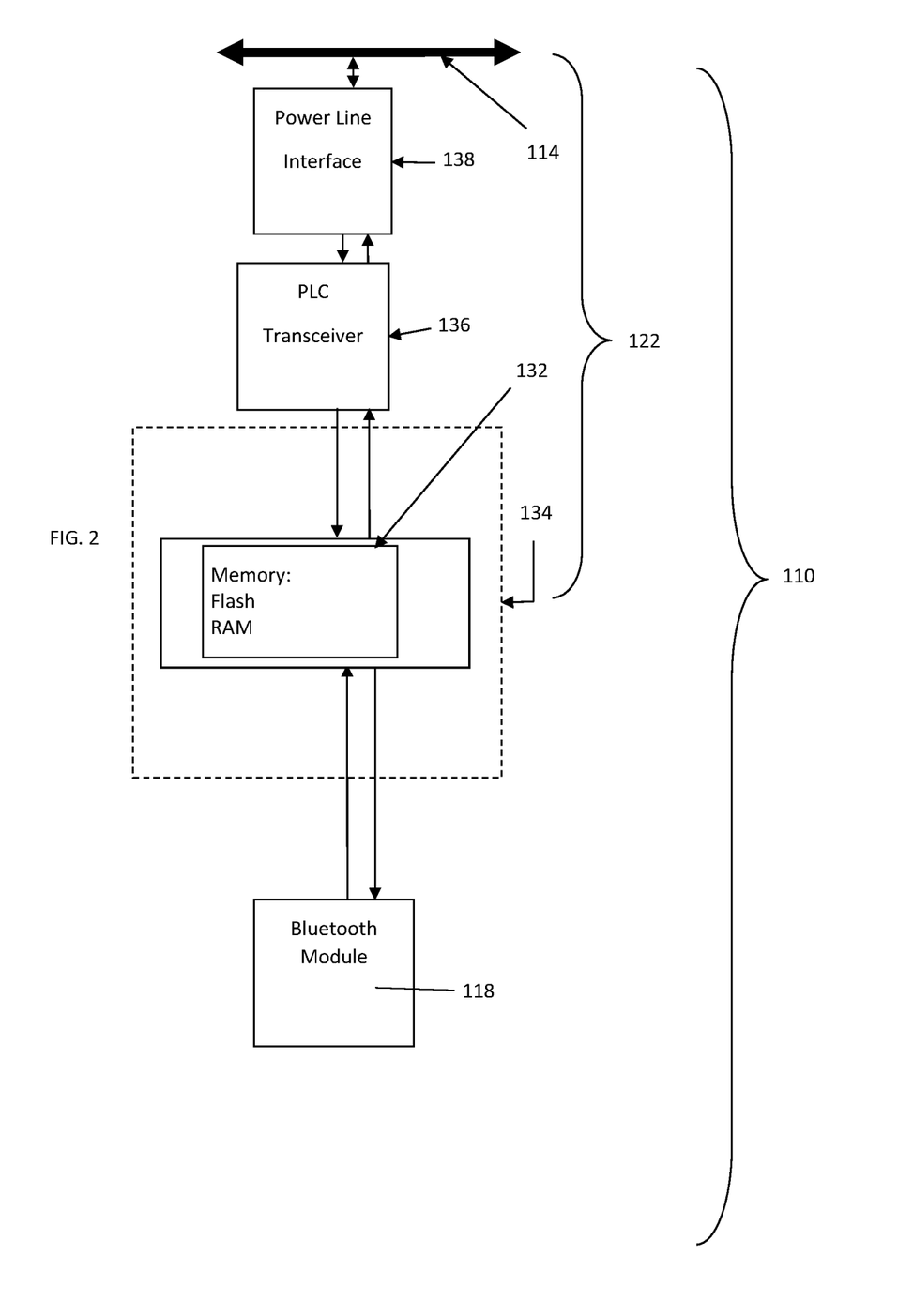
FIG. 2 is a detailed block diagram of the PLC tag and Bluetooth module shown in FIG. 1.

Referring first to FIGS. 1 and 2, there is depicted one aspect of the tractor-trailer data communication apparatus 100 and method for determining the identification entity of and the order of hook-up of a tractor and the plurality of serially or tandem connected trailers. For example, as shown in FIG. 1, a tractor 102 has a plurality with three trailers 104, 106, and 108 shown by way of example only, connected serially or in tandem to the tractor 102. It will be understood that the trailer 104 is usually directly connected to the tractor 102; while trailers 106 and 108 ride on dollies connected to the rear end of the proceeding trailer 104 or 106.

In the trucking industry, the tractor 102 is electrically connected to the trailer 104 and the trailers 106 and 108 are connected to each other by seven conductor umbilical cords connecting the electrical systems of tractor 102 to the electrical systems of the trailers 104, 106, and 108 to control trailer lighting, brake lights, braking, etc.

Due to the introduction of additional electronic systems in trailers, such as ABS brake controllers, tire air pressure monitor systems and refer temperature controls, a power line carrier (PLC) system is used to bi-directionally transmit signals along one of the conductors of the PLC system between the tractor 102 and the trailers 104, 106, and 108. As shown in FIGS. 1 and 2, the PLC system 110 is shown extending in signal communication from the tractor 102 through each of the trailers 104, 106, and 108.

In the first aspect shown in FIGS. 1 and 2, the apparatus 100 includes the following hardware on the tractor 102 and each trailer 104, 106 and 108. The PLC system 110 includes a PLC Gateway 112 or reader in the form of a data communication terminal, as well as a PLC bus 114 that includes at least one of the conductors in the umbilical cords connecting the tractor 102 to the trailer 104 and connecting the trailers 104, 106, and 108 to each other.

The tractor 102 carries a Bluetooth module 116 that is capable of wirelessly communicating with Bluetooth modules 118 in the tandem series of trailers 104, 106, and 108. The PLC Gateway 112, also referred to as a PLC Gateway reader, is illustrated as being mounted in the tractor 102. It will be understood that the PLC Gateway 112 may be mounted in either the tractor 102 or any of the trailers 104, 106, and 108.

The PLC Gateway 112 can also be a PLC CAN gateway sold by Hegemon Electronics, Inc. The PLC Gateway 112 provides a gateway for CAN, RS232, J1708, or J1939 equipped devices to get access to the PLC messages that reside on the tractor and trailer power lines (e.g., through PLC bus 114). The PLC Gateway 112 thus acts as an interface between the telemetrics unit 120 and the PLC tags 122 to bi-directionally relay messages from the PLC tags 122 to the telemetrics unit 120 and vice versa. PLC tags can also be trailer PLC gateway units themselves.

A telemetrics unit 120 is mounted in the tractor 102 and provides communication between the tractor 102 and a remotely located central processing unit 124, which can be mounted at the headquarters of the trucking company.

The PLC Gateway 112 typically communicates by hardwire conductors 126 to the telemetrics unit 120 using any OBC device using J1708, J1939, J1587, RS232, CanBus USB etc. As shown in FIG. 1, the telemetrics unit 120 communicates through an antenna 128 to a satellite, not shown, or to a cell tower 130 through the Internet and/or hardwired conductors to communicate the data from the PLC Gateway 112 to an external host computer remotely located processor. The telemetrics unit 120 can also communicate with the external satellite and computer-based host system through cellular, satellite, Wi-Fi, 802, etc., communications. The telemetrics unit 120 can also have tracking options such as GPS, RFID, RTLS, etc. Telemetric units 120 are available from several companies, including, for example, Qualcomm, GE, International Telemetrics, RTL, Xata, Peoplenet, Skybitz, StarTrak, Partech, Cadec, Fleet-Mind, Turnpike, Navman, etc.

Each trailer 104, 106, and 108 includes a Bluetooth module 118 in communication with a PLC tag 122 mounted on each trailer 104, 106, 108. Each PLC tag 122 is in data communication with the PLC bus 114. The PLC tag 122 may be a PLC identifier tag manufactured by Hegemon Electronics, Inc., Sterling Heights, Mich. The PLC tag 122 functions as a reader to read data from the memory 132 of the PLC tag 122 and transforms the data into a format capable of communication over the existing tractor-trailer PLC bus 114. The PLC tag 122 includes a PLC tag processor 134 that accesses data and a control program stored in one or more memories 132. The PLC tag 122 includes input and output ports namely, UART, I²C, or SPI.

The PLC tag processor 134 communicates through a PLC transceiver 136 and a power line interface 138 to bidirectionally receive and transmit data from the PLC tag 122 over the existing PLC bus 114 to the PLC Gateway 112 mounted in the tractor 102.

During the installation the tractor 102 and the trailers 104, 106, and 108, the tractor 102 and each trailer 104, 106, and 108 will be provided with at least one unique identification number or identification. Each identification is unique to each trailer or a tractor and can include a particular identification identifying it as a tractor or a trailer. For example, the identification may include an alphanumeric segment identifying a particular tractor and trailer. A prefix, suffix, or a segment of the message may also include a binary code identifying the particular identification as uniquely belonging to a tractor or a trailer.

Alternately, the identifications assigned to tractors may be of a particular class to readily identify identification as belonging to a tractor or a trailer and to differentiate such tractor identifications from the trailer identifications, which are part of a different alphanumeric class.

Figure 3:
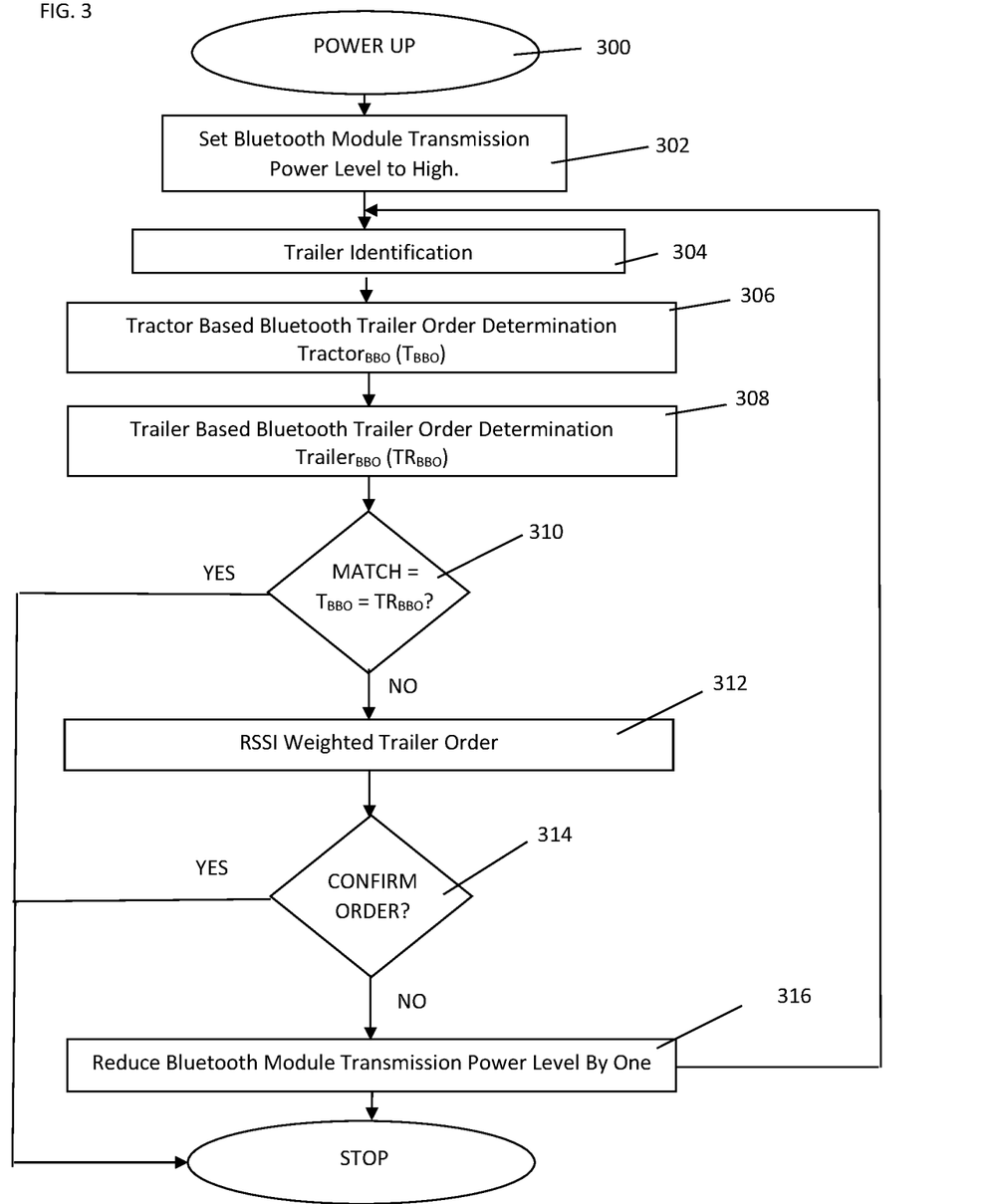
FIG. 3 is a flow diagram of a trailer ordering method.

Referring to FIG. 3, which is flow diagram of a method for determining trailer order in one example. The details of the recited steps will be described in greater detail following the overview. The process begins at power up 300 of the tractor 102. The method sets the Bluetooth module(s) power level to its highest setting 302. A trailer identification process 304 is performed. A tractor-based Bluetooth trailer order ($T_{BBO}$) is determined in a process 306. A trailer-based Bluetooth trailer order ($TR_{BBO}$) is determined in a process 308. The $T_{BBO}$ is compared to the $TR_{BBO}$ to determine if they match at 310. If the $T_{BBO}$ matches the $TR_{BBO}$ the trailer order is known, and the processes may stop. In another example, the process may sporadically or continuously cycle to monitor changes in the trailer arrangement or to make corrections. If the $T_{BBO}$ does not match the $TR_{BBO}$, a RSSI weighted trailer order process 312 is performed. The RSSI weighted trailer order process 312 then is utilized to confirm one of the $T_{BBO}$ or the $T_{RBBO}$ at step 314. If neither order can be confirmed, the method reduces the Bluetooth module(s) power level by a setting 316, and the process goes through another cycle. In one example, the power level has at least seven different settings.

Figure 4:
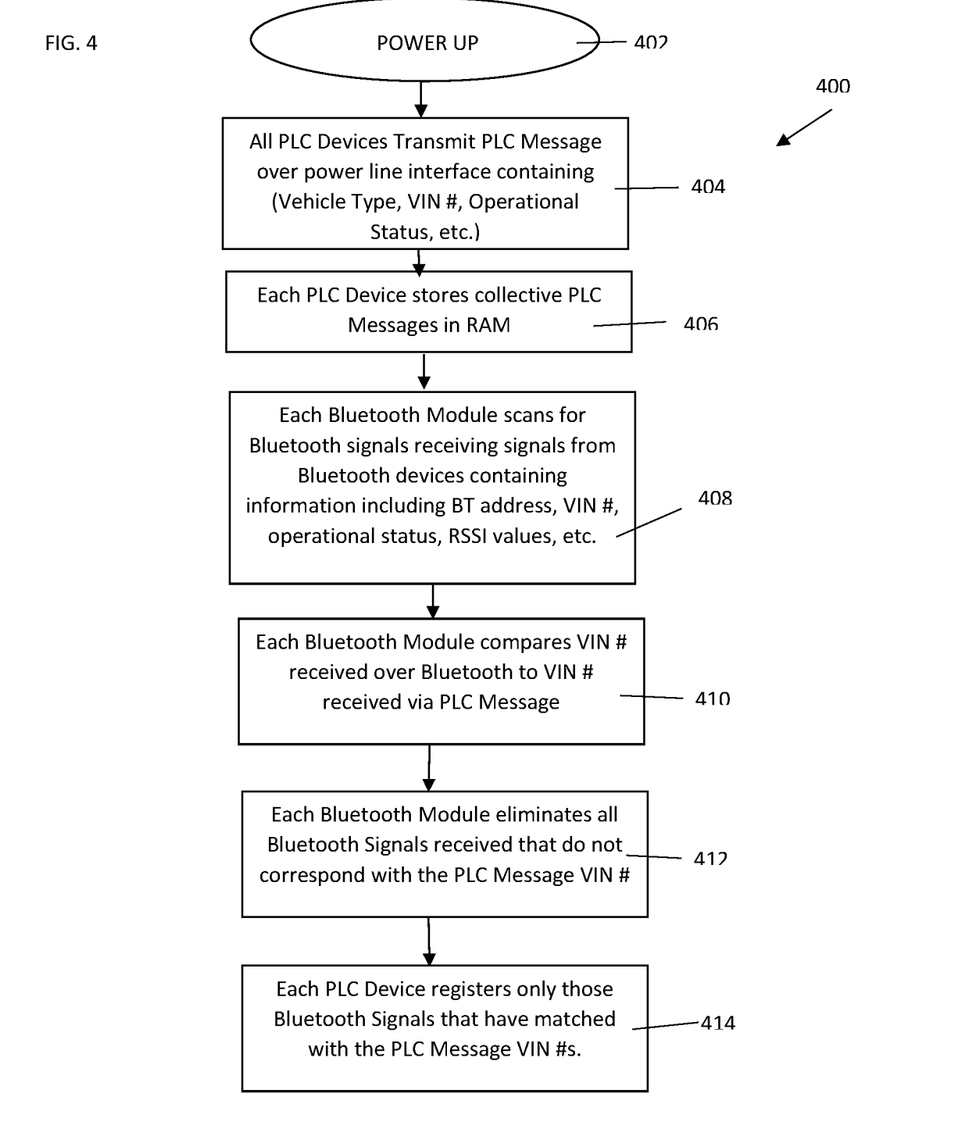
FIG. 4 is flow diagram of the trailer identification process shown in FIG. 3.

FIG. 4 is a detailed example of the trailer identification process 304 described in FIG. 3. The process 400 begins at power up 402. The process 400 has all PLC devices transmit a PLC message over the power line interface 404. The PLC messages may contain a variety of information about the vehicles or trailers in which they are installed. This includes, but is not limited to, vehicle type, VIN #, operational status, and the status of components such as ABS, cooling temperatures, etc. Each PLC device stores the collective PLC messages in RAM 406. Each Bluetooth module (in the tractor 102 and the trailers 104, 106, 108) broadcasts and scans for Bluetooth signals and reads the information containing BT addresses, VIN #s, operational status, and records the RSSI values of the signals 408. Each Bluetooth module compares the VIN #s received via Bluetooth signals to the VIN #s stored in the PLC devices 410. Each Bluetooth module then eliminates all Bluetooth signals (by eliminating their BT address that do not correspond to a PLC stored VIN #412. Each PLC device then registers only those BT addresses that correspond to a matching VIN #414. In this fashion, the system keeps a record of BT addresses from the tractor 102 and trailers 104, 106, 108 and will not be confused by close parked trailers or interference via stray Bluetooth signals.

Figure 5:
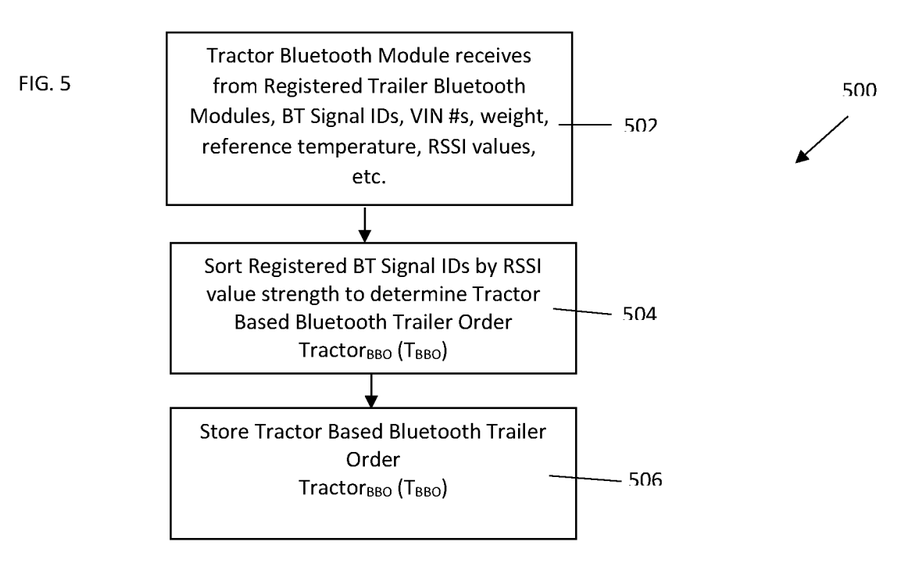
FIG. 5 is a flow diagram of the tractor-based Bluetooth trailer order determination shown in FIG. 3.

FIG. 5 is a detailed flow diagram of the tractor-based Bluetooth trailer order process 306 shown in FIG. 3. The process 500, begins by receiving, by the tractor Bluetooth module, signals from the registered trailer Bluetooth modules, which include their BT address or ID, VIN #s, etc. and having RSSI values (received signal strength indicator) 502. In one example, a single RSSI value is received for each registered Bluetooth module. In another example, a plurality of RSSI values are received from each registered Bluetooth module and these values are averaged to produce a single RSSI value for that module. The process 500 then sorts the registered BT address by RSSI values to determine a tractor-based Bluetooth trailer order ($T_{BBO}$) 504. By way of example, if the tractor Bluetooth module 116 receives a signal from trailer B that has a RSSI value of −79.4, a signal from trailer C that has a RSSI value of −82.4 and a signal from trailer D that has a RSSI value of −87.3, the $T_{BBO}$ would be set as Tractor-Trailer B-Trailer C-Trailer D. The PLC then stores the tractor-based Bluetooth trailer order ($T_{BBO}$) 506.

Figure 6:
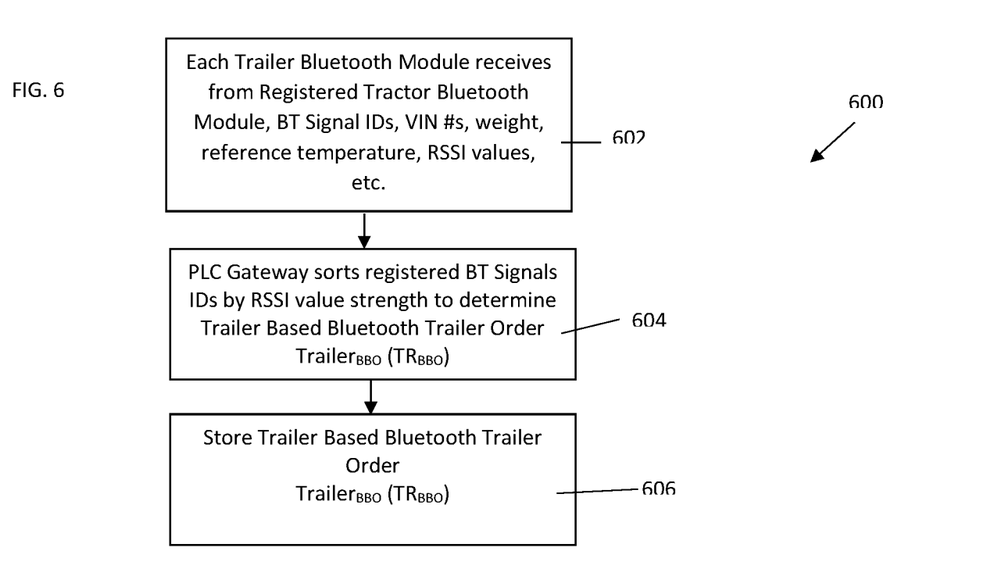
FIG. 6 is a flow diagram of the trailer-based Bluetooth trailer order determination as shown in FIG. 3.

FIG. 6 is a detailed flow diagram of the trailer-based Bluetooth trailer order process 308 shown in FIG. 3. The process 600 begins by having each trailer Bluetooth module 118 receive a registered Bluetooth signal from the tractor Bluetooth module 116 and read its content and register its RSSI value 602. In one example, a single RSSI value is received for each registered Bluetooth module. In another example, a plurality of RSSI values are received from each registered Bluetooth module and these values are averaged to produce a single RSSI value for that module. The process 600 then sorts the trailer Bluetooth modules based on the strength of the RSSI values each registers from the tractor to generate a trailer-based Bluetooth trailer order $TR_{BBO}$ 604. By way of example, if the trailer Bluetooth module in trailer B receives a signal from the tractor module with an RSSI value of −80.8, the trailer C Bluetooth module receives a signal from the tractor module with an RSSI value of −81.2, and the trailer D Bluetooth module receives a signal from the tractor module with and an RSSI value of −89.1, then the $TR_{BBO}$ would be set as Tractor-Trailer B-Trailer C-Trailer D. The process 600 then stores the $TR_{BBO}$ 606.

Figure 7:
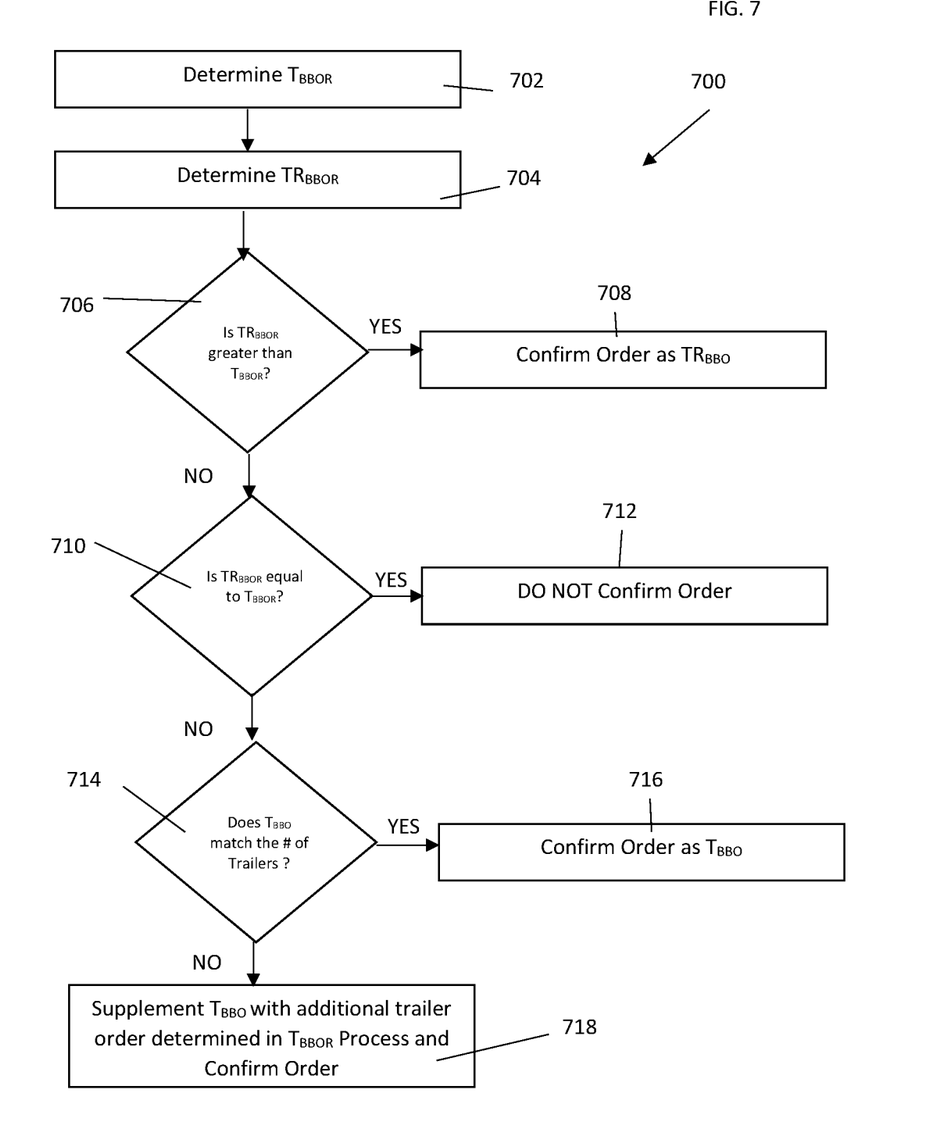
FIG. 7 is a flow diagram of the RSSI weighted trailer process shown in FIG. 3.

FIG. 7 is a detailed flow diagram of the RSSI weighted trailer order process 312 as shown in FIG. 3. The process 700 includes determining a $T_{BBO}$ Reliability Factor ($T_{BBOR}$) at 702 and determining a $TR_{BBO}$ Reliability Factor ($T_{RBBOR}$) at 704. The calculations of these factors will be explained in detail in FIGS. 8 and 9. The process 700 determines if the $TR_{BBOR}$ is greater than the $T_{BBOR}$ 706. If it is, the process 700 confirms the trailer order as $TR_{BBOR}$ 708. If it is not, the process 700 determines of the $TR_{BBOR}$ is equal to the $T_{BBOR}$ 710. If they are equal, at 712 the process 700 returns a non-confirmed order status to step 314 of FIG. 3. The process 700 then checks the $T_{BBO}$ at 714 to see if it matches the number of trailers determined by the PLC devices in the trailer identification sequence. If the number of trailers match, the process 700 confirms the trailer order as $T_{BBO}$ at 716. If the number of trailers does not match at 714, the process 700 supplements the $T_{BBO}$ with the additional order of trailers as determined by their closest signal strength determined in the $T_{BBOR}$ process at 718. For example, if the $T_{BBO}$ only registers four trailers while the PLC devices indicate six, the $T_{BBOR}$ process (as described below) will indicate the closest trailer to trailer #4, which can be supplemented to the $T_{BBO}$ as trailer #5. Similarly, the $T_{BBOR}$ process will indicate the closest trailer to trailer #5, which can be supplemented to the $T_{BBO}$ as trailer #6 and so on.

Figure 8A:
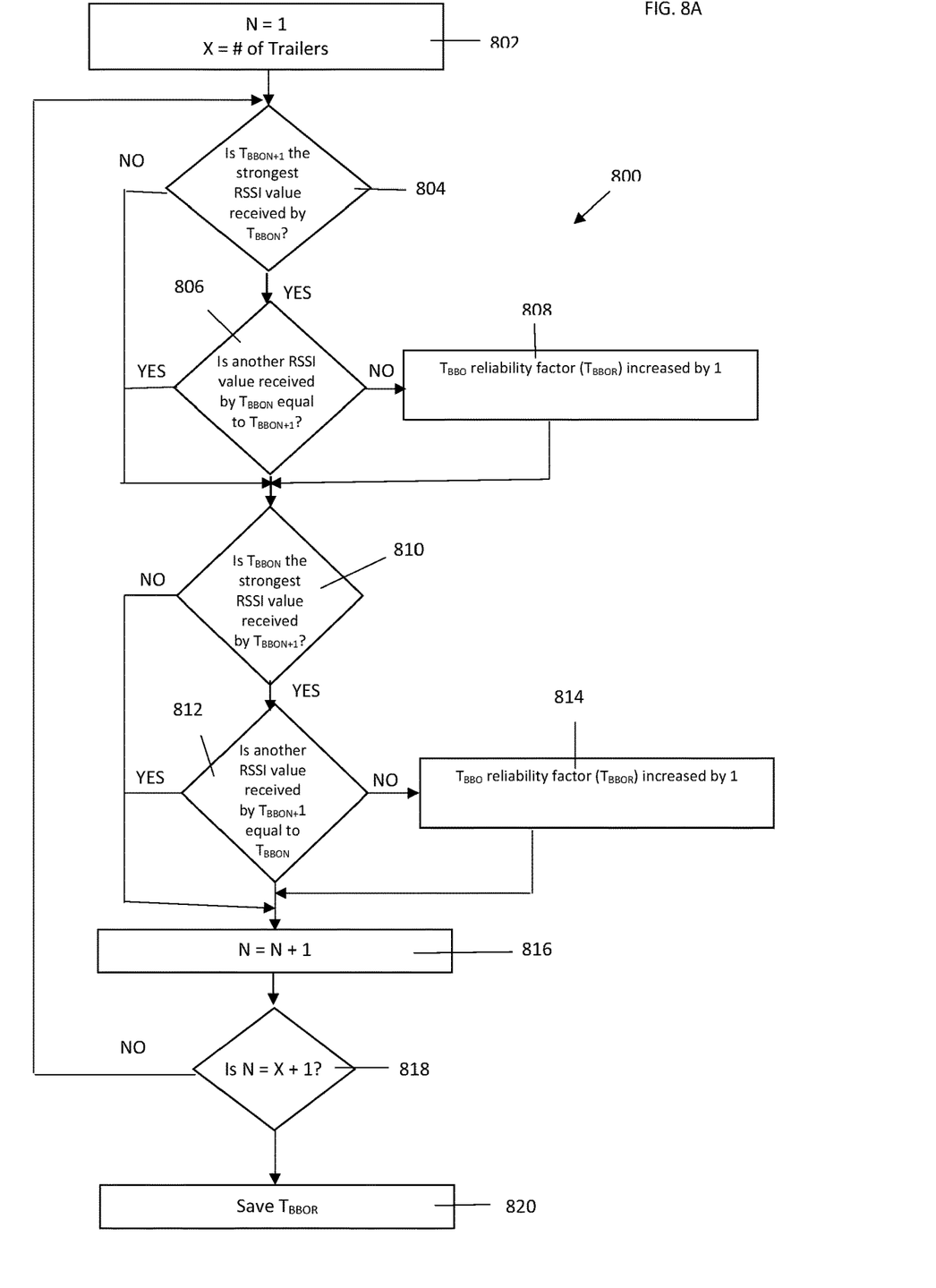
FIG. 8A is a flow diagram of the tractor-based Bluetooth trailer order reliability factor determination as shown in FIG. 7.
Figure 8B:
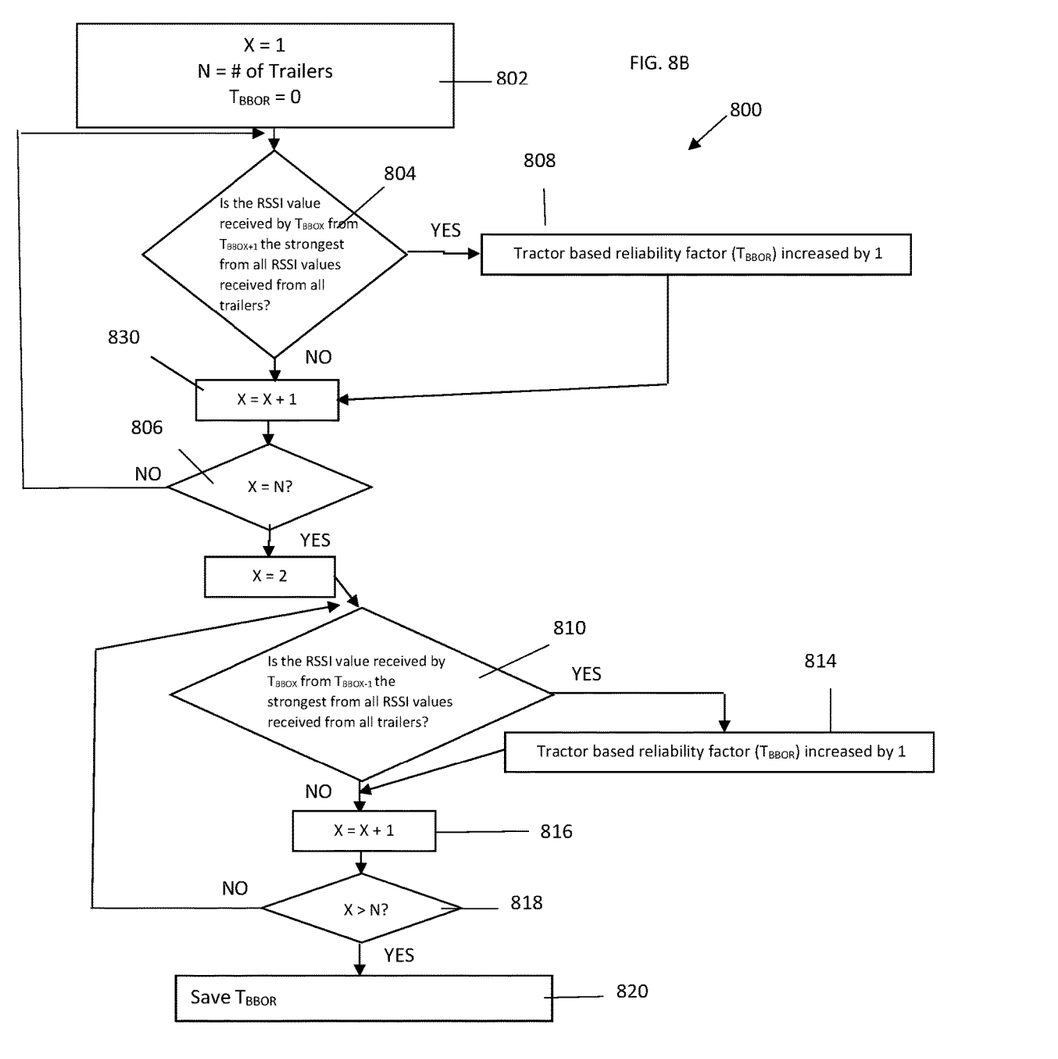
FIG. 8B is an alternate flow diagram of the tractor-based Bluetooth trailer order reliability factor determination as shown in FIG. 7.

FIG. 8A is a detailed diagram of the $T_{BBOR}$ process (702) described in FIG. 7. The process 800 sets a variable N to 1 and a variable X to the number of trailers determined by the PLC system at 802. The process 800 then checks to see if the signal of the second trailer in the $T_{BBO}$ is the strongest RSSI signal received by the first trailer in the $T_{BBO}$ (i.e., is $T_{BBON+1}$ the strongest RSSI signal received by $T_{BBON}$?) at 804. If it is, the process further checks to see if any other RSSI signals received by $T_{BBON}$ are equal to $T_{BBON+1}$ at 806. If there are no matching values, the process 800 increases a $T_{BBO}$ Reliability Factor $T_{BBOR}$ by one at 808. If there is a matching value or the signal of the second trailer is not the strongest RSSI signal, the process does not increase the $T_{BBOR}$. The process 800 then checks the reverse. The process 800 checks to see if the signal of the first trailer in the $T_{BBO}$ is the strongest RSSI received by the second trailer in the $T_{BBO}$ (i.e., is $T_{BBON}$ the strongest signal received by $T_{BBON+1}$?) at 810. If it is, the process further checks to see if any other RSSI signals received by $T_{BBON+1}$ are equal to $T_{BBON}$ at 812. If there are no matching values, the process 800 increases a $T_{BBO}$ Reliability Factor $T_{BBOR}$ by one at 814. If there is a matching value or the signal of the first trailer is not the strongest RSSI signal, the process does not increase the $T_{BBOR}$. The process 800 then increases the value of N by one at 816, checks to see if the last trailer has been evaluated at 818, and continues the loop until all the trailers have been reviewed. When finished, the process 800 stores the $T_{BBOR}$ at 820. An alternate flow chart depicting the same process as described in FIG. 8A is depicted in FIG. 8B.

Figure 9A:
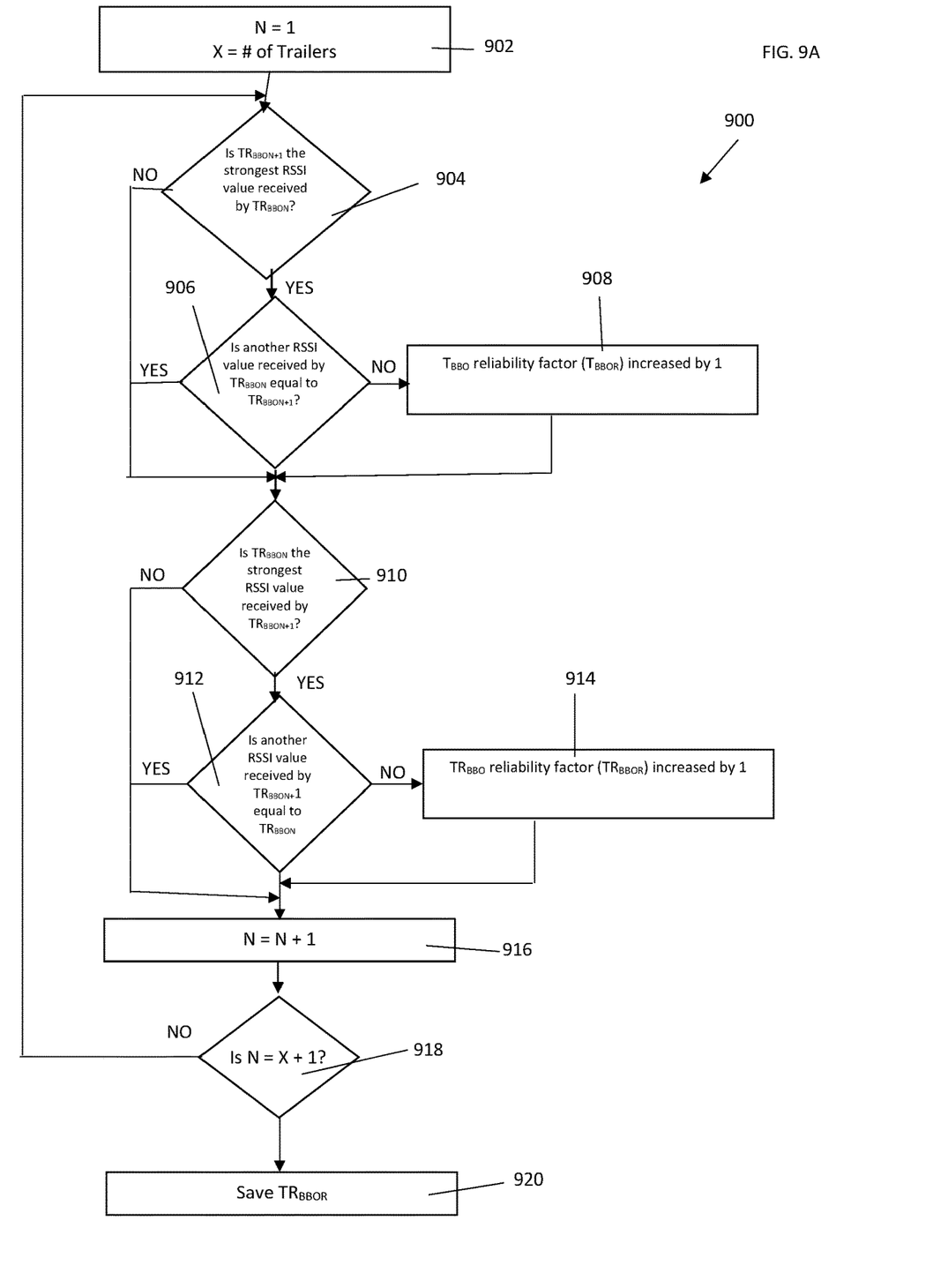
FIG. 9A is a flow diagram of the trailer-based Bluetooth trailer order reliability factor determination as shown in FIG. 7.
Figure 9B:
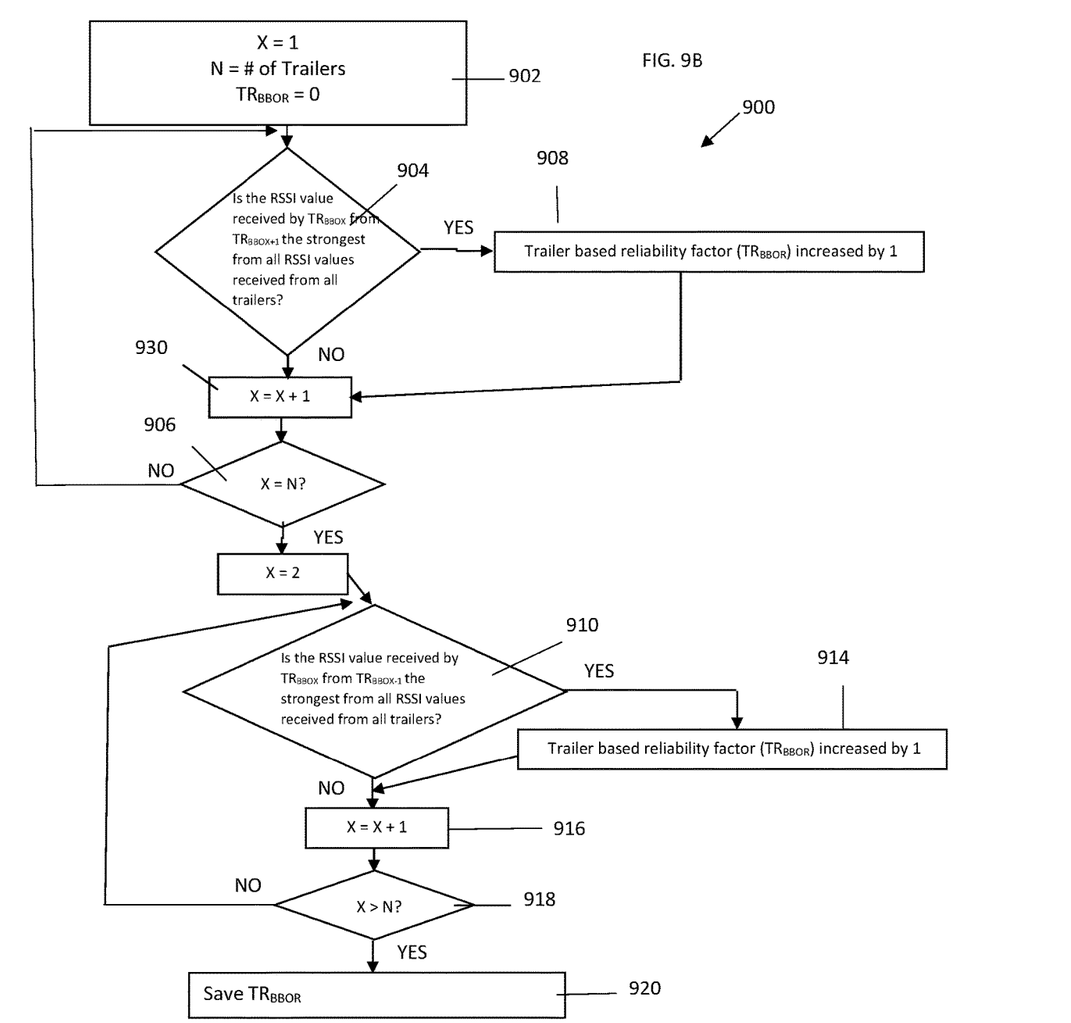
FIG. 9B is an alternate flow diagram of the trailer-based Bluetooth trailer order reliability factor determination as shown in FIG. 7.

FIG. 9 is a detailed diagram of the $TR_{BBOR}$ process (704) described in FIG. 7. The process 900 sets a variable N to 1 and a variable X to the number of trailers determined by the PLC system 902. The process 900 then checks to see if the signal of the second trailer in the $T_{RBBO}$ is the strongest RSSI signal received by the first trailer in the $T_{RBBO}$ (i.e., is $TR_{BBON+1}$ the strongest RSSI signal received by $TR_{BBON}$?) at 904. If it is, the process further checks to see if any other RSSI signals received by $TR_{BBON}$ are equal to $TR_{BBON+1}$ at 906. If there are no matching values, the process 900 increases a $T_{RBBO}$ Reliability Factor $TR_{BBOR}$ by one at 908. If there is a matching value or the signal of the second trailer is not the strongest RSSI signal, the process does not increase the $TR_{BBOR}$. The process 900 then checks the reverse. The process 900 checks to see if the signal of the first trailer in the $T_{RBBO}$ is the strongest RSSI received by the second trailer in the $T_{RBBO}$ (i.e., is $T_{RBBON}$ the strongest signal received by $TR_{BBON+1}$?) at 910. If it is, the process further checks to see if any other RSSI signals received by $TR_{BBON+1}$ are equal to $TR_{BBON}$ at 912. If there are no matching values, the process 900 increases a $T_{BBO}$ Reliability Factor $T_{BBOR}$ by one at 914. If there is a matching value or the signal of the first trailer is not the strongest RSSI signal, the process does not increase the $TR_{BBOR}$. The process 900 then increases the value of N by one at 916, checks to see if the last trailer has been evaluated at 918, and continues the loop until all the trailers have been reviewed. When finished, the process 900 stores the $TR_{BBOR}$ 920. An alternate flow chart depicting the same process as described in FIG. 9A is depicted in FIG. 9B.

Although this disclosure has utilized Bluetooth modules as an example, it is contemplated that any form of wireless communication could be utilized with the disclosed processes. In addition, although PLC system technology has been described, a variety of wired communication systems could implement the disclosed invention including, but not limited to, RS232, RS485, Ethernet, etc.

Figure 11:
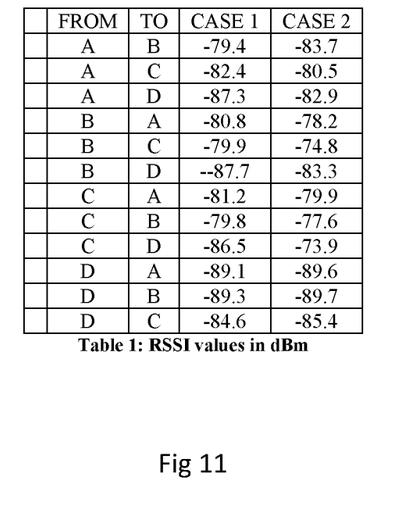
FIG. 11 is a chart of sample data for exemplary purposes.

In yet another example describing the process, referring to FIGS. 10 and 11, two cases are disclosed. The following illustrates two sample applications of the afore described process:

Case A: Signals received back from all trailer devices and the RSSI values are correct and linear.
Step 1: See Table I in FIG. 11.
Step 2a: A to B=−79.4, A to C=−82.4, A to D=−87.3
RSSI order=−79.4 and then −82.4 and then −87.3 therefore
Trailer order=Tractor to B to C to D.
Step 2b: B to A=−80.8, C to A=−81.2, D to A=−89.1
RSSI order=−80.8 and then −81.2 and then −89.1 therefore
Trailer order=Tractor to B to C to D.
Step 2c: Step 2a and Step 2b match so the trailer order is known, stop.
Case B: RSSI values are not linear or not in order.
Step 2a: A to B=−83.7, A to C=−80.5, A to D=−82.9
RSSI order=−80.5 and then −82.9 and then −83.7
Trailer order=Tractor to C to D to B
Step 2b: B to A=−78.2, C to A=−79.9, D to A=−89.6
RSSI order=−78.2 to −79.9 to −89.6
Trailer order=Tractor to B to C to D
Step 2c: Step 2a and Step 2b do not match therefore go to Step 3.
Step 3: From Step 2a: T#1=C, T#2=D, T#3=B

| | |
|---|---|
| Is C next to D?, C is master | T |
| Is D next to B?, D is master | F |
| Is D next to C?, D is master | T |
| Is B next to D?, B is master | F |

Step 4: From Step 2b: T#1=B, T#2=C, T#3=D

| | |
|---|---|
| Is B next to C?, B is master | T |
| Is C next to D?, C is master | T |
| Is C next to B?, C is master | F |
| Is D next to C?, DE is master | T |

Step 5:
Step 4 has more T's so the trailer order is: Tractor to B to C to D.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method of determining a sequential order of a series of trailers attached to a tractor, the method comprising:
    setting a Bluetooth module system power level to its highest setting;
    performing, using a PLC system and the Bluetooth module system, a trailer identification routine, the routine comprising:
        identifying, by the PLC system, trailer VIN #s of attached trailers;
        scanning, by the Bluetooth module system, for Bluetooth signals containing Bluetooth Addresses, trailer VIN #s, and RSSI values;
        comparing, by the Bluetooth module system, the trailer VIN #s from the Bluetooth signals to the trailer VIN #s from the PLC system;
        eliminating, by the Bluetooth module system, Bluetooth addresses that do not contain matching trailer VIN #s; and
        registering, by the Bluetooth module system, Bluetooth addresses that contain matching trailer VIN #s;
    determining, by the Bluetooth module system, a tractor-based Bluetooth trailer order;
    determining, by the Bluetooth module system, a trailer-based Bluetooth trailer order;
    comparing, by the Bluetooth module system, the tractor-based Bluetooth trailer order to the trailer-based Bluetooth trailer order;
    setting, by the Bluetooth module system, a registered trailer order if the tractor-based Bluetooth trailer order matches the trailer-based Bluetooth trailer order;
    utilizing, by the Bluetooth module system, a RSSI weighted trailer order process if the tractor-based Bluetooth trailer order does not match the trailer-based Bluetooth trailer order; and
    setting, by the Bluetooth module system, a registered trailer order as either the tractor-based Bluetooth trailer order or the trailer-based Bluetooth trailer order based on the RSSI weighted trailer order.

2. The method of claim 1, wherein determining the tractor-based Bluetooth trailer order comprises:
    receiving, by a tractor Bluetooth module, registered Bluetooth addresses and their RSSI values from a plurality of trailer Bluetooth modules;
    sorting, by the Bluetooth module system, the registered Bluetooth addresses by RSSI value strength to determine the tractor-based Bluetooth trailer order; and
    storing, by the Bluetooth module system, the tractor-based Bluetooth trailer order.

3. The method of claim 1, wherein determining the trailer-based Bluetooth trailer order comprises:
    receiving, by a plurality of trailer Bluetooth modules, a registered Bluetooth address and its RSSI value from a tractor Bluetooth module;
    sorting, by the Bluetooth module system, the registered Bluetooth address by RSSI value strength to determine the trailer-based Bluetooth trailer order; and
    storing, by the Bluetooth module system, the trailer-based Bluetooth trailer order.

* * * * *